June 27, 1933.  H. A. LAMPLUGH  1,916,056
SEAT
Filed July 28, 1931   2 Sheets-Sheet 1
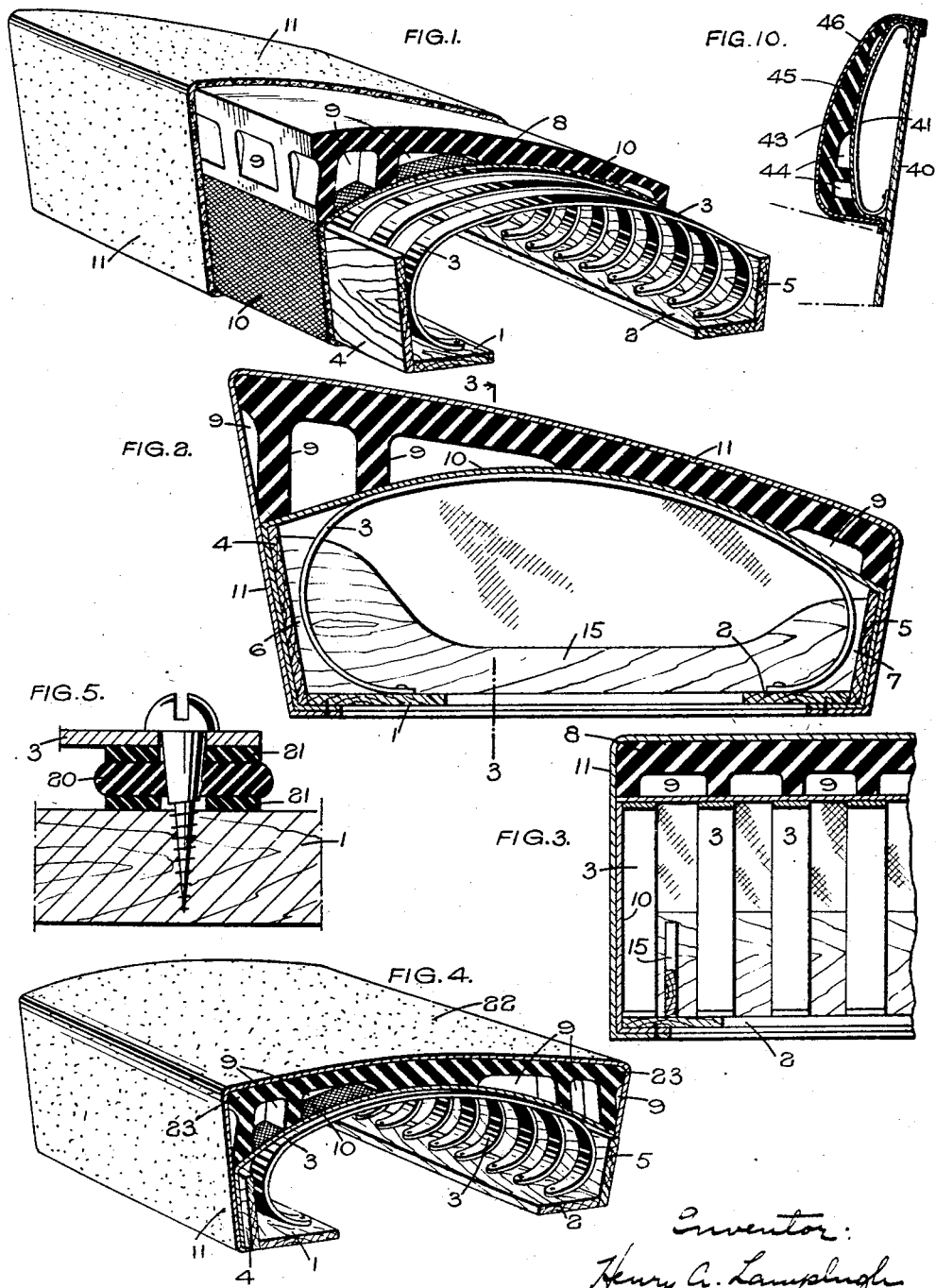

June 27, 1933. H. A. LAMPLUGH 1,916,056
SEAT
Filed July 28, 1931 2 Sheets-Sheet 2
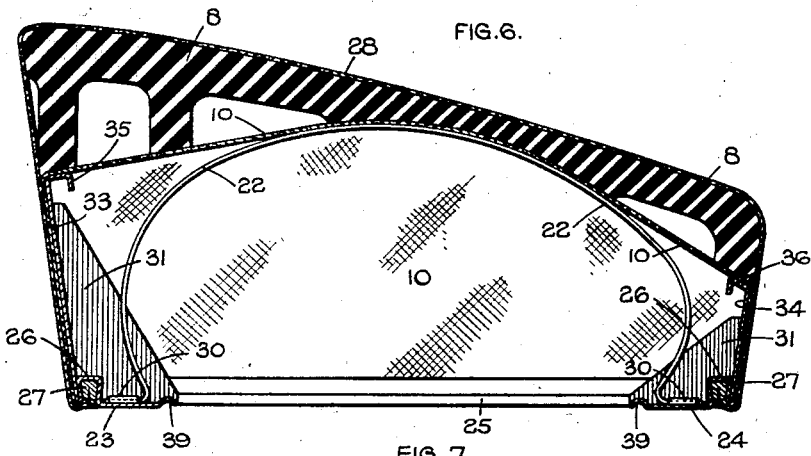
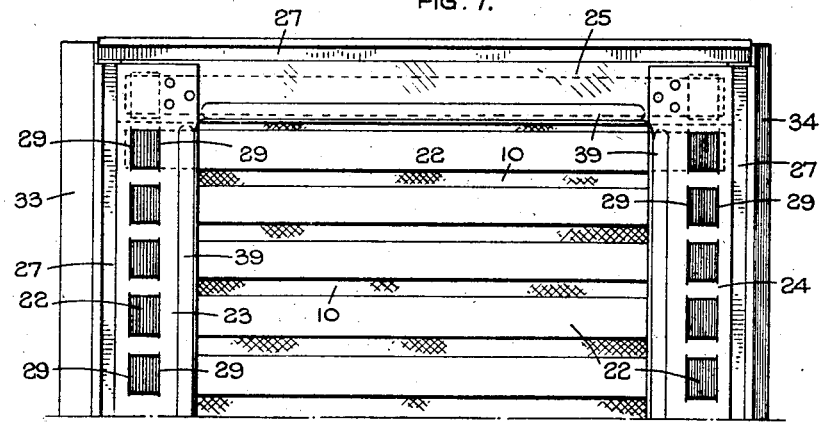
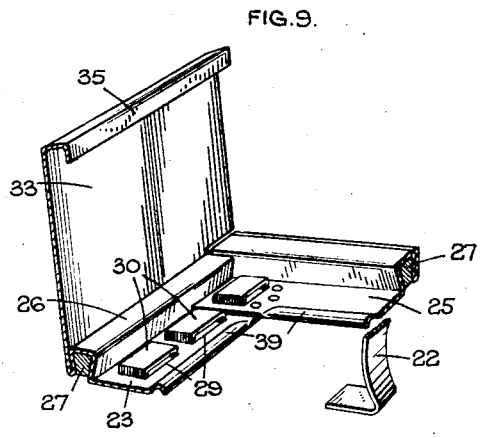
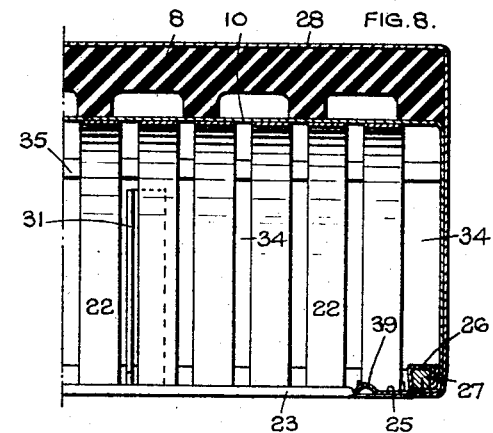
Inventor:
Henry A. Lamplugh
by Richard E. Babcock
Attorney Patented June 27, 1933

1,916,056

UNITED STATES PATENT OFFICE

HENRY ARTHUR LAMPLUGH, OF LEAMINGTON, ENGLAND

SEAT

Application filed July 28, 1931, Serial No. 553,617, and in Great Britain July 31, 1930.

This invention relates to seats and is applicable to seats generally. By the term "seats" I intend to include either a seat or a seat back or an arm rest, and the word seat as used hereinafter is to be understood as applying to any of these.

The objects of the present invention are to provide a seat giving greater comfort in use; which is very widely applicable, e. g. to road or rail vehicles, or to furniture or places of entertainment; in which the liability to broken or fatigued springs is eliminated; which will constitute an hygienic seat by dispensing with dust holding and unhygienic forms of hair or other stuffing, and which can be produced at a competitive price.

The loading on a seat is not uniformly distributed. Considering the loading over the width (back to front) of a seat the greater part of the load is applied to an area having as its centre a position rather behind a point half way between back and front edges. Behind this heavily loaded area the load is relatively slight, and in front of the heavily loaded area is an area which is loaded much less heavily by the legs of the sitter.

In addition to its other objects, the present invention seeks to provide a seat in which the quality of the support given varies across the width of the seat (back to front or top to bottom) substantially in accordance with the loading.

A further object of the present invention is to provide an improved construction of supporting frame incorporating improved means whereby the bowed spring strips may be attached thereto and incorporating improved means whereby the covering material of the seat may be attached.

According to the present invention, in a seat I combine together an understructure or backing of upwardly bowed spring strips and a seat top or front incorporating a moulded pad of sponge rubber or similar material. By the term "upwardly bowed" I include "outwardly bowed" as used in a seat back.

As an alternative to sponge rubber I may use a known material comprising a pad of rubber coated hair, this material being mouldable and having other properties very similar to those of sponge rubber in that it is extremely resilient and soft and returns to its original shape after deformation.

In combining together a seat top which includes a pad of sponge rubber or similar material and a supporting structure of bowed spring strips, I prefer to construct the seat top of moulded sponge rubber or similar material of greater thickness or depth at the front. By constructing the seat top in this manner, I obtain a seat contour corresponding with the orthodox practice, i. e. the seat top is somewhat inclined downwardly from its front edge towards the back. The seat top may be substantially flat or slightly convex, while at its rear edge it may be curved downwardly.

In the preferred arangement the upwardly bowed springs are mounted on suitable bearers, and means are provided for limiting the endwise movement of the springs under load, such means taking the form of front and back strips or bars, and the sponge rubber or like top is supported at its centre part (where the greatest load is applied) upon the spring strips, and at its front and rear edges preferably upon the said front and back strips or bars.

Thus the load is taken by the spring strips, while the sponge rubber or like top, which in itself is incapable of supporting the load without an altogether undesirable amount of deflection, forms a soft cushion between the load and the springs.

At the front (and at the rear if required) the edge portion of the sponge rubber top is much deeper in thickness than elsewhere and is supported preferably on the front (or front and back) strip or bar. In addition this portion (or portions) may be moulded with cavities in its underside so that it constitutes a deep soft edge to the seat for providing comfortable support for the legs of the sitter.

For a seat having a reversible back (as in tramcars) or for equal sided cushions for any purpose, both front and rear edge portions of the sponge rubber or like seat top will be of deep construction and may have the cavities.

The sponge rubber or like top can be moulded to any desired form or contour, and in all arrangements the central part where the main load is applied is supported sufficiently by the springs so that the seat as a whole will retain its original shape indefinitely.

In order better to distribute the load over the length of the seat, particularly in a long seat (as commonly provided for two or more persons) I may provide between the bowed springs and the seat top, or incorporated under or moulded in the seat top, one or more longitudinally placed spring strips.

The resiliency of the seat may be improved by providing resilient rubber or sponge rubber members between the ends of the springs and the frame to which they are attached. Such members may be in the form of washers, or a continuous strip may be used, and the securing members employed by the springs may pass through such washers or through said strip.

If sponge rubber is used, the washers or the strip may be a suitable thickness and it may have a surface of relatively hard rubber, or both surfaces may be of relatively hard rubber with an intervening soft or sponge rubber layer or layers.

Referring to the drawings:—

Figure 1 is a perspective view showing one form of the present invention.

Figure 2 is a sectional view in side elevation.

Figure 3 is a sectional view on line 3—3, Figure 2.

Figure 4 is a perspective view showing another construction.

Figure 5 is a sectional view illustrating a further part of the invention.

Figure 6 is a sectional view in side elevation showing another construction.

Figure 7 is an underside plan view

Figure 8 is a sectional front view.

Figure 9 is a perspective view showing one corner of the supporting frame.

Figure 10 is a sectional view in side elevation showing the invention applied to the back of a seat.

In the construction shown in Figures 1, 2 and 3, the seat comprises bearer members 1 and 2 which may be of wood or other suitable material carrying upwardly bowed spring strips 3 which are mounted in spaced relationship to each other. The bearer members 1 and 2 are connected together by members 15 extending from back to front.

The front bearer member 1 is provided with a front strip or bar 4 which may be of wood or any other suitable material, and the back bearer member 2 is provided with a back strip or bar 5.

It will be seen that there is a gap between the front of each of the springs 3 and the strip 4, the said gap being shown at 6, and a similar gap 7 is shown between the rear of each spring and the strip 5.

When the spring strips are loaded they tend to spread from back to front or to move frontwardly or backwardly, and the strips 4 and 5 limit this motion.

The seat top in this construction consists of a single piece of moulded sponge rubber 8 which is moulded with cavities 9 under its forward part, thus increasing the softness or compressibility of the forward portion of the pad. There may be additional cavities 9 under the back edge portion.

The pad 8 is vulcanized to a canvas or other strip 10 by which it is attached to the seat, the canvas being taken under the bearers 1 and 2 and secured thereto.

The outer cover 11 is secured over the pad 8 and canvas 10 and encloses the whole.

In the construction shown in Figure 4, the seat top 22 is provided with deep compressible portions 23 both at the front edge portion and at the rear edge portions. Both of these deep portions may be provided with cavities 9, the purpose of this construction being to provide a seat for use with a reversible back as on tramcars where both edges of the seat are in turn the front edge.

If required auxiliary spring strips may be provided mounted on the bearers 1 and 2, such spring strips being of upwardly bowed form and engaging under the centre parts of the spring strips 3 so as to reinforce them at the position where the load is applied.

A seat constructed in accordance with the present invention is constructed to provide the necessary support at the position where the main part of the load is applied, this support being afforded by the springs so that the centre part of the sponge rubber or other seat top is supported against an undesirable amount of deflection.

Further, a seat constructed in accordance with the present invention provides a support at the front edge portion which is very soft and compressible locally, but which does not deflect at this portion as a whole.

Thus the quality of the support given by the seat varies across the width of the seat (back to front) in accordance with the loading.

In Figure 5 I have illustrated a method of increasing the resilience of the supporting structure by using washers or strips of sponge rubber 20 between the springs 3 and the bearer 1 or 2.

If required the washer or strip 20 may have washers 21 above and below it which are of ordinary rubber or of metal.

If required, two or more separate pieces of sponge rubber or the like may be employed to build up a pad for a seat top and may be made of different degrees of aeration so that one part of the seat top will be more resilient than another.

If one or more spring strips are used disposed within or below the sponge rubber or like seat top arranged to pass across the spring members of the seat and extending from side to side or end to end of the seat, these may be vulcanized within the sponge rubber or the like or placed between layers of sponge rubber or vulcanized or placed between the underside of the rubber and the canvas.

In the construction shown in Figures 6 to 9, the supporting frame for the springs 22 is made of sheet metal. The supporting frame is of rectangular form and includes a front member 23, a back member 24 and side members 25, these members being riveted together at the corners.

The front, back and side members 23, 24 and 25 are all provided with pressed up grooves 26 in which strips 27 of fibre or other suitable material are forced so that the outer covering fabric or material 28 of the seat can be readily tacked thereto.

The strips 23, 24 and 25 are all stiffened at their inner edges by ribs 39. The strips 23 and 24 are further slit at 29 and the metal between each pair of slits is pressed upwardly as shown at 30 to provide a series of loops for the outwardly bent ends of the springs 22. The operation of assembling the springs is thus greatly simplified.

The front and back members 23 and 24 in addition to being connected by the end members 25 may be stiffened intermediate their ends by corner plates 31.

The front and back members 23 and 24 are provided with upwardly bent portions 33 and 34, the upper edges of which are bent into channels 35 and 36.

The portions 33, 35, and 34, 36 serve to limit endwise expansion of the springs 22, while the portions 35 and 36 form substantially rigid supports for the front and back edges of the seat top 8 which may be constructed identically with the seat top 8 as illustrated in Figures 1, 2 and 3.

The invention has hitherto been described as applied to a seat proper. It is, however, to be understood that it is equally well applicable to the backs of seats or to arm rests or the like. In Figure 10 the invention is illustrated as applied to the back of a seat. In this construction the seat is built up of a back panel 40 which may be of wood and springs 41 are attached thereto by any suitable method such as screwing.

On the front of the springs a pad of sponge rubber 43 or other soft moulded material is placed. This pad may have cavities 44 if desired to increase the softness at any particular part. The pad 43 may be vulcanized to a canvas or other fabric foundation 45, and the pad may be retained in position by an outer cover 46, the ends or edges of which are secured to the back panel 40.

What I claim then is:—

1. A seat comprising a support, upwardly bowed spring strips on said support and arranged in spaced relationship, a moulded pad of soft elastic material superposed on said spring strips, said pad having cavities in its front portion to provide local resilience and a solid central portion where the loading is maximum, and a sheet of fabric secured to the underside of said pad, said fabric embracing said support and forming the means of attaching the pad thereto.

2. A seat comprising a support, upwardly bowed spring strips on said support and arranged in spaced relationship, front and back bars arranged respectively adjacent to, but not in contact with, the front and back ends of the spring strips so as to limit endwise movement of said strips, and a moulded pad of soft elastic material superposed on said spring strips, said pad having on the underside thereof a portion supported on said front bar, a further portion supported on the bowed springs adjacent the front end thereof, recesses between said portions, and between the last named portion and a further portion having a large bearing surface at the central part of the said springs.

3. A seat comprising a support, upwardly bowed spring strips on said support and arranged in spaced relationship, front and back bars arranged respectively adjacent to, but not in contact with, the front and back ends of the spring strips so as to limit endwise movement of said strips, and a moulded pad of soft elastic material superposed on said spring strips, said pad having on the underside thereof in succession in transverse section therethrough, a portion supported on said front bar, a recess, a portion supported on said springs adjacent the front end thereof, a further recess, and a further portion having a large bearing length across the central part of said springs.

4. A seat comprising a support, upwardly bowed spring strips on said support and arranged in spaced relationship, front and back bars arranged respectively adjacent to, but not in contact with, the front and back ends of the spring strips so as to limit endwise movement of said strips, and a moulded pad of soft elastic material superposed on said spring strips, said pad having on the underside thereof in succession in transverse section therethrough, a portion supported on said front bar, a recess, a portion supported on said springs adjacent the front end thereof, a further recess, a further portion having a large bearing length across the central part of said springs, a further recess, and a portion supported on said back bar.

5. A seat comprising a support, upwardly bowed spring strips on said support and arranged in spaced relationship, front and back bars arranged respectively adjacent to, but not in contact with, the front and back ends of the spring strips so as to limit endwise movement of said strips, and a moulded pad of soft elastic material superposed on said spring strips, said pad having a portion supported on said front bar, a portion supported on said springs adjacent the front end thereof, a further portion having a large bearing length across the central part of said springs, and recesses on the underside of the pad between said portions, the front portion of the pad bridging the gap between the said front bar and the front end of the springs.

6. A seat comprising a support, upwardly bowed spring strips on said support and arranged in spaced relationship, front and back bars arranged respectively, adjacent to, but not in contact with, the front and back ends of the spring strips so as to limit endwise movement of said strips, and a moulded pad of soft elastic material superposed on said spring strips, said pad having a portion supported on said front bar, a portion supported on said springs adjacent the front end thereof, a further portion having a large bearing length across the central part of said springs, and a portion supported on said back bar, and recesses on the underside of the pad between said portions, said pad bridging the gap between the ends of said springs and the front and back bars.

In witness whereof I affix my signature,

HENRY ARTHUR LAMPLUGH.